United States Patent Office 3,282,892
Patented Nov. 1, 1966

3,282,892
POLYAMIDES CONTAINING A PHOSPHATE, AN ALKALI IODIDE AND AN IRON COMPOUND AS STABILIZERS
Wolfgang Griehl and Siegfried Schaaf, Chur, Switzerland, assignors to Inventa A.-G., fur Forschung und Patentverwertung Lucerne, Lucerne, Switzerland
No Drawing. Filed May 27, 1963, Ser. No. 283,541
Claims priority, application Switzerland, July 11, 1962, 8,357/62
2 Claims. (Cl. 260—45.75)

The present invention relates to a process of improving the stability of polyamides under heat and the product formed thereby.

Articles manufactured from polyamides, as for example, synthetic linear polyamides obtained by the polycondensation of ε-aminocaproic acid or the lactam thereof, adipic acid-hexamethylenediamine, ε-aminoundecanoic acid or mixtures thereof, have the disadvantage of becoming embrittled under heat in the presence of oxygen and are, therefore, not reliable for use over a long period of time at temperatures over 100° C. Many stabilizers have been proposed to prevent the embrittlement of polyamides at high temperatures. For example, such organic heat stabilizers as amines, mercaptobenzimidazoles or NN'-polymethylene-bis-O-hydroxybenzamide have been proposed. British Patent No. 722,724 and U.S. Patent No. 2,705,227 describe the stabilization of polyamides by combining copper salts and inorganic halogenides. However, these proposed compounds are not compatible with the polyamide and tend to produce solid deposits, so that it is not feasible to polymerize them with the polymer since they cannot produce therewith a homogeneous fused mass. By means of other infusion processes in producing the finished polymer, as for example, though the use of a screw press or a calendar, the stabilizers may be satisfactorily worked into and incorporated into the polymer but such processes require additional steps.

One object of the present invention is to provide a new and improved process for stabilizing a polyamide against the destructive effect of heat, which does not have the drawbacks of the prior art described.

Another object of the present invention is to provide a new and improved stabilized polyamide produced by the aforesaid new and improved process.

In accordance with the present invention, the stability of the polyamide is improved by adding to polyamides, or to the starting materials or intermediates from which the polyamide is formed, in finely divided form, prior to polymerization, a stabilizer comprising (1) an alkali or earth-alkali phosphate or an organic phosphate having a boiling point above 200° C., (2) an alkali iodide, and (3) an iron-II (divalent iron) compound. As iron-II compounds, there may be employed either inorganic salts or organic iron compounds, such, for example, as iron-II-diethanolamine sulfate and iron-II naphthenate. As phosphates, as already indicated, there may be used alkali or earth-alkali phosphates or organic phosphates, with boiling points of over 200° C., as, for example, triphenyl phosphate, condensation product of 2,2'-bis (p-hydroxyphenyl) propane and phosphorous acid. The quantities added may have a concentration in relation to the polyamide within the following approximate range:

Iron salt—0.01–0.2%, preferably 0.02–0.06%;
Alkali iodide—0.1–5%, preferably 0.5–2%;
Phosphates —0–2%, preferably 0.1–0.5%.

It has been found that when the heat stabilizers according to the invention have been used, the durability of the polyamides, e.g. the durability of polycaprolactam, at a temperature of 160° C., measured on a monofil thread of 0.1 mm. diameter, amounts to about 1000–1500 hours. On the other hand, hitherto known stabilizers under similar conditions stood up under heat for only barely 1000 hours.

The following examples illustrate certain ways in which the principles of the invention can be applied, but are not to be construed as limiting the broader aspects of the invention.

Example 1

10 kg. of polycaprolactam chips are thoroughly mixed with 5 g. of water-free $FeSO_4$, 25 g. $NaH_2PO_4$ and 100 g. finely powdered potassium iodide. The mixture was then made into a wire in a heated screw press and the wire thus formed was comminuted. A stretched thread made from these heat-stabilized particles, 0.1 mm. in diameter, was subjected to heat treatment at 160° C. in a drying chamber. Only after 1200 hours did embrittlement of the thread begin to become apparent. Unstabilized polycaprolactam becomes brittle after a mere two hours.

Example 2

30 kg. of caprolactam are polycondensed in the usual way in an autoclave, but before the start of the conversion, there are added thereto, 1.5 liter of water, 20 g.

$FeSO_4 \cdot 7H_2O$ 75 g. $NaH_2PO_4$ and finally 100 g. of potassium iodide. The threads obtained from this polymerizate with a diameter of 0.1 mm. remain elastic and firm at 160° C. for 1100 hours.

Example 3

To a dissolving vessel containing 20 kg. of adipic acid-hexamethylenediamine and 7 liters of water at 90–100° C., there is added 8 g. $FeSO_4 \cdot 7H_2O$ dissolved in 50 ml. water, 50 g. $NaH_2PO_4$ dissolved in 500 ml. water, and 120 g. potassium iodide dissolved in 300 ml. water, and the mixture is thoroughly stirred. The mixture is polycondensed in an autoclave for 3 hours under pressure, then without pressure for another 6 hours at 280° C. The nylon 6.6 melt thus obtained is transferred to a spinning area and converted into 0.1 mm. diameter threads. The threads are heated in the presence of air to 160° C. and embrittlement is found to set in only after 1520 hours.

Example 4

In a 1 liter beaker containing 800 g. of water-free caprolactam under nitrogen at 120° C., there are added 00.5 g. iron-II-naphthenate, 1.5 g. triphenylphosphate, 4 g. morpholine idoide and 11.8 ml. of a 3-molar solution of methyl magnesium bromide in ether. The mixture is heated in a heating chamber to 150° C. At this temperature, after the addition of 7.5 g. acetyl caprolactam, the polymerization of the caprolactam sets in within a few minutes. After 20–30 minutes, the conversion or reaction is concluded. The resulting polyamide block is comminuted, and by the usual melt-and-spin process is converted into threads of 0.1 mm. The heating test reveals that at 160° C., embrittlement only sets in after 1160 hours.

Example 5

20 kg. polyenanthlactam were heated under nitrogen to 260° C. and while stirring were thoroughly mixed with 6 g. $FeSO_4$, 50 g. $NaH_2PO_4$ and 80 g. potassium iodide. The threads 0.1 mm. in diameter produced from the resulting melt by spinning and stretching, were aged in a drying chamber in circulating air at 160° C. The samples became embrittled only after 1460 hours.

While the invention has been described with particular reference to specific embodiments, it is to be understood that it is not to be limited thereto but is to be construed broadly and restricted solely by the scope of the appended claims.

What is claimed is:

1. A composition containing a polyamide and 0.1–5.0% by weight in relation to the polyamide of an alkali iodide, 0.1–2.0% by weight in relation to the polyamide of a phosphate having a boiling point of over 200° C. and of the class consisting of an alkali phosphate, an earth-alkali phosphate and an organic phosphate, and 0.01–0.2% by weight in relation to the polyamide of an iron salt of the class consisting of iron(II)naphthenate, iron(II)diethanolamine sulphate and ferrous sulphate.

2. A composition as described in claim 1, in which the alkali iodide is present in proportions of 0.5–2.0% by weight in relation to the polyamide, the phosphate is present in proportions of 0.1–0.5% by weight in relation to the polyamide, and the iron salt is present in proportions of 0.02–0.06% by weight in relation to the polyamide.

References Cited by the Examiner

UNITED STATES PATENTS 2,705,227  3/1955  Stamatoff _____ 260—45.75

FOREIGN PATENTS 603,122  12/1961  Belgium.
938,702  10/1963  Great Britain.

LEON J. BERCOVITZ, *Primary Examiner.*

G. W. RAUCHFUSS, Jr., *Assistant Examiner.*